United States Patent [19]

Yamasaki

[11] 4,226,131
[45] Oct. 7, 1980

[54] BICYCLE REAR DERAILLEUR

[75] Inventor: Kazuto Yamasaki, Osaka, Japan

[73] Assignee: Maeda Industries, Ltd., Osada, Japan

[21] Appl. No.: 951,798

[22] Filed: Oct. 16, 1978

[30] Foreign Application Priority Data

Oct. 14, 1977 [JP] Japan .............................. 52-123829

[51] Int. Cl.² ........................... F16H 9/00; F16H 7/12
[52] U.S. Cl. .................................... 474/82; 474/134; 474/135
[58] Field of Search ..................... 74/217 B, 242.11 B; 280/238

[56] References Cited

U.S. PATENT DOCUMENTS

| 3,181,383 | 5/1965 | Juy | 74/217 B |
| 3,364,762 | 1/1968 | Maeda | 74/217 |
| 3,364,763 | 1/1968 | Juy | 74/217 |
| 3,677,103 | 7/1972 | Huret et al. | 74/217 B |
| 3,702,080 | 11/1972 | Huret et al. | 74/217 B |
| 3,896,679 | 7/1975 | Huret et al. | 74/242.11 B |
| 4,061,048 | 12/1977 | Huret et al. | 74/242.11 B |

FOREIGN PATENT DOCUMENTS

| 456495 | 5/1949 | Canada | 74/217 B |
| 742354 | 3/1933 | France | 74/242.11 B |
| 745898 | 5/1933 | France | 74/217 B |
| 785015 | 7/1935 | France | 74/217 B |
| 962355 | 6/1950 | France | 74/217 B |
| 1127291 | 12/1956 | France | 74/217 B |
| 443574 | 12/1948 | Italy | 74/217 B |
| 440377 | 12/1935 | United Kingdom | 74/217 B |
| 509793 | 7/1939 | United Kingdom | 280/236 |

Primary Examiner—Leslie Braun
Attorney, Agent, or Firm—Birch, Stewart, Kolasch & Birch

[57] ABSTRACT

A bicycle rear derailleur which comprises a first shaft on which a guide pulley guard is pivotally mounted and resiliently urged in one direction, a second shaft supported by the guide pulley guard, an inner pulley rotatably mounted on the second shaft, a guide pulley rotatably mounted on the inner pulley, a tension link mounted at its upper end to the second shaft so as to be coaxially movable with the inner pulley and resiliently urged so as to be swingable in one direction, a tension pulley rotatably mounted on a third shaft which is supported by the tension link and a tension pulley guard.

5 Claims, 5 Drawing Figures

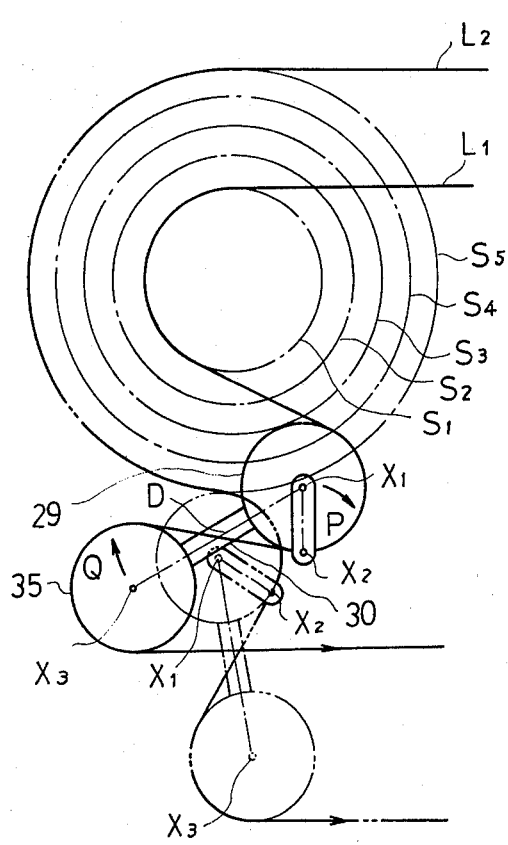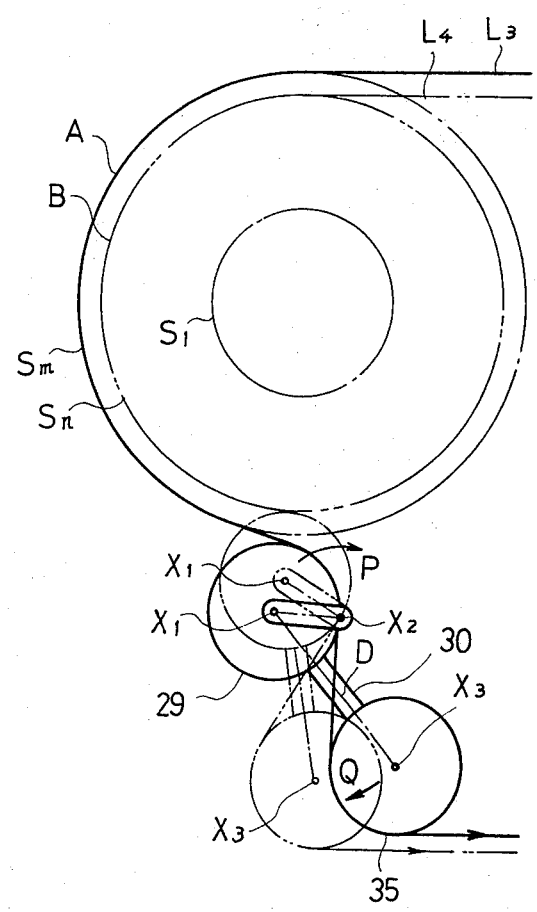

BICYCLE REAR DERAILLEUR

BACKGROUND AND SUMMARY OF THE INVENTION

The present invention relates to a bicycle rear derailleur, and more particularly to improvements in the rear derailleur which cooperates for effecting desired speed change with a multi-stage freewheel assembly having a plurality of sprocket wheels of different diameter and mounted on a rear wheel hub spindle of a bicycle.

As is well known in the art, the bicycle rear derailleurs heretofore proposed may be roughly divided into the three types on the basis of configuration of a pulley guard, that is, the so-called triangular balance type or three-point balancing type, the balance type or see-saw type, and the pendulum type. The typical example of the triangular balance type is disclosed in U.S. Pat. No. 3,181,383. The typical example of the balance type is disclosed in U.S. Pat. No. 3,364,762. And the typical example of the pendulum type is disclosed in U.S. Pat. No. 3,677,103. Every type of those conventional rear derailleurs has advantages as well as disadvantages. More particularly, the triangular balance type has such disadvantage that it does not permit a large derailleur capacity (ability for absorbing looseness in the driving chain), though having at the same time such advantages that it permits a constant distance between a guide pulley and each sprocket wheel thereby to effect a smooth shifting of the running chain from one sprocket wheel to another. Whereas, the pendulum type has such a disadvantage that it is difficult to keep a constant distance between a guide pulley and each sprocket wheel, though having such an advantage that it permits a large derailleur capacity. The balance type is, so to speak, a compromise between the other two types, which realizes neither the maximum derailleur capacity nor the constant distance between the guide pulley and each sprocket wheel.

Accordingly, it is an object of the present invention to eliminate the above-discussed prior art deficiencies.

Another object of the invention is to provide an improved bicycle rear derailleur which permits a sufficient derailleur capacity.

A further object of the invention is to provide an improved bicycle rear derailleur which facilitates keeping a constant distance between a guide pulley and each sprocket wheel.

A still further object of the invention is to provide an improved bicycle rear derailleur which permits an easy and smooth shifting of a bicycle driving chain.

A yet further object of the invention is to provide an improved bicycle rear derailleur which has a wide applicability to a various dimension of a multi-stage freewheel assembly.

A still further object of the invention is to provide an improved bicycle rear derailleur which is capable of well balancing the relative relation among a chain tension, resiliency in a guide pulley shaft, and resiliency in a tension pulley shaft.

Other objects, features and advantages of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 4 and 5 are diagramatic elevations showing the operation of the rear derailleur of the invention, respectively.

DESCRIPTION OF THE PREFERRED EMBODIMENTS

Figure 1:
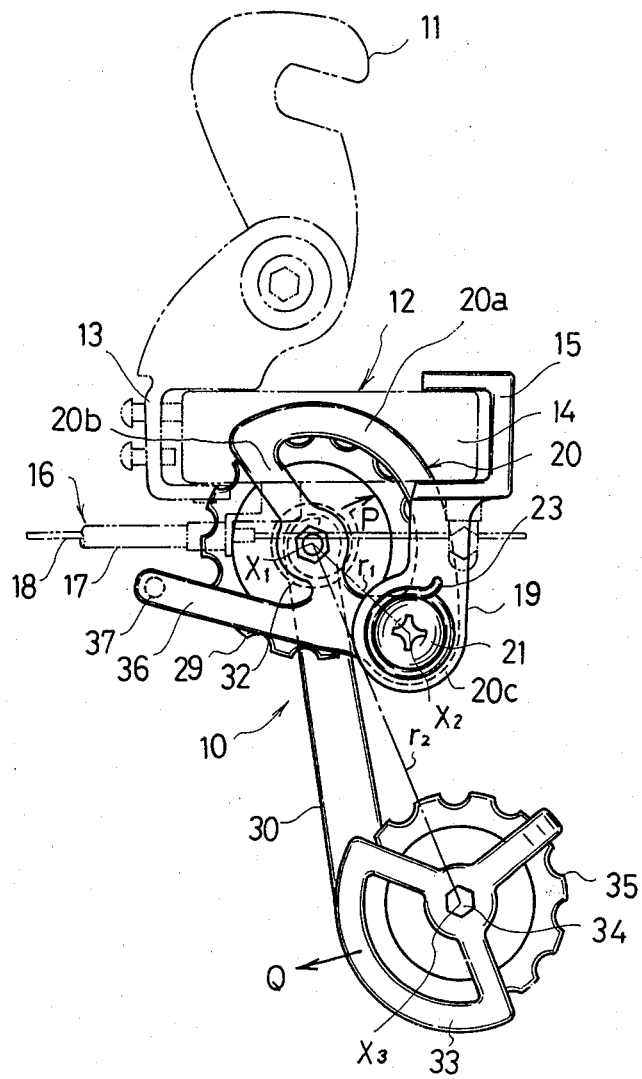
FIG. 1 is a front elevation of the rear derailleur of the present invention viewed across the longitudinal axis of a bicycle positioned with its front wheel directed rightward.
Figure 2:
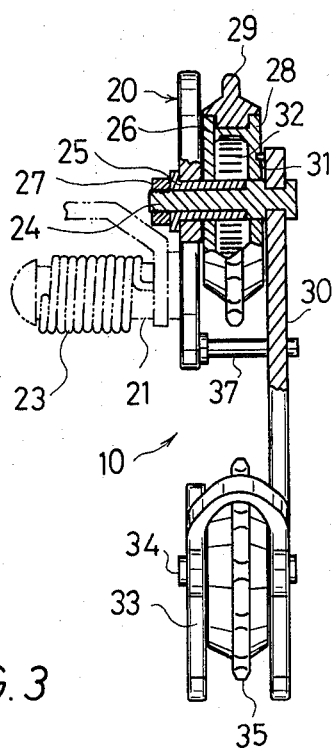
FIG. 2 is a right side elevation with part broken away, showing parts of FIG. 1.
Figure 3:
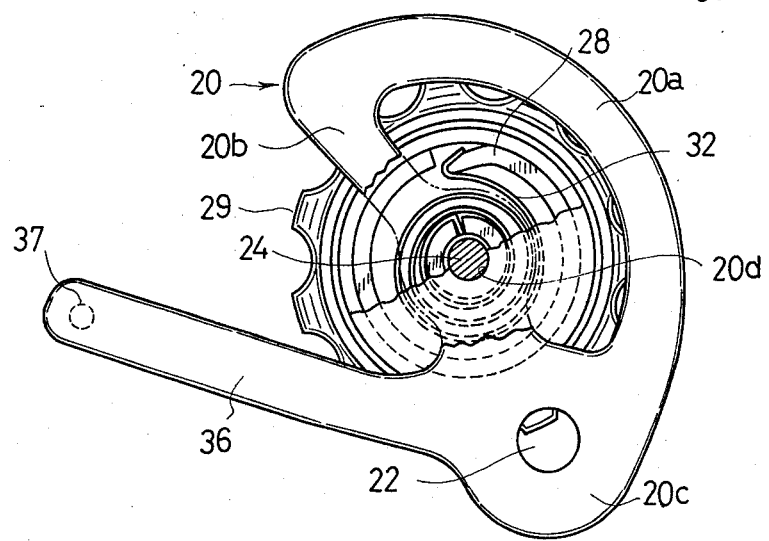
FIG. 3 is an enlarged elevation with parts broken away, illustrating the guide pulley and the guard therefor.

Referring now by reference numerals to the drawings, in particular to FIGS. 1 to 5, the bicycle rear derailleur 10 of the present invention is mounted to a known mounting bracket 11 which is secured to a rear wheel hub spindle (not shown) of a bicycle, conventionally. The derailleur 110 comprises a known deformable parallelogramic shifter 12 which includes a stationary element 13 to be secured to said mounting bracket 11, a pair of connecting elements 14 supported at one side ends by said stationary element 13 so as to extend therefrom in parallel, and a movable element 15 mounted to the other side ends of said pair of elements 14. The pair of elements 14 are forcibly spaced apart by a certain distance from each other by means of springs (not shown), and said distance can be resiliently variable in accordance with tension imparted by a control cable 16 consisting of an outer wire 17 and an inner wire 18, so that a mounting arm 19, which is rigidly connected to or integral with the movable element 15, can be shifted in the directions substantially parallel with respect to the axis of the rear wheel hub spindle. The basic construction as well as function of the parallelogramic shifter per se are well known in the art, and several types thereof have been proposed and actually utilized, every of which is applicable to the derailleur of the present invention.

A guide pulley guard 20 may preferably be of bow-like shape having an upper arcuate portion 20a and a lower straight portion 20b, and should be disposed aslant in such a manner that said straight portion 20b is inclined by a certain angle toward the rear end of a bicycle, with one end portion 20c lowered. The guard 20 is pivotally supported at said lower end portion 20c by means of a shaft 21 which is mounted to a supporting hole 22 (FIG. 3) formed in said end portion 20c and further secured fixedly to said mounting arm 19. On said shaft 21 is mounted a coil spring 23 in such a manner that the guard 20 is always urged by the spring 23 so as to rotate on the shaft 21 in the clockwise direction as shown by an arrow P.

In the center of said straight portion 20b of the guard 20 therre is formed a supporting hole 20d (FIG. 3) into which a guide pullye supporting shaft 24 is fixedly mounted by the aid of a 25, a washer 26, and a lock nut 27. It should be noted that, as apparent from the above-described arrangement of the guard 20, the guide pulley supporting shaft 24 is located above the horizontal level where said shaft 21 is located.

On the shaft 24 is rotatably mounted an inner pulley 28 preferably made of oilless metal. A guide pulley 29 is mounted so as to be freely rotatable on said inner pulley 28. Further, the free end of the shaft 24 mounts the upper end of a downwardly extending tension link 30 so that it is coaxially rotatable on the shaft 24 together with the inner pulley 28 by the aid of a connecting pin 31. Between the inner pulley 28 and its shaft 24 is interposed a flat spiral spring 32 in such a manner that one terminal end thereof is secured in position to the pulley 28, while its other terminal end to the shaft 24, so that the tension link 30 is always urged to swing in the clockwise direction as shown by an arrow Q. The lower end of the link 30 is formed with a tension pulley guard 33 of suitable configuration, in such a manner that they cooperate to support a tension pulley supporting shaft 34 therebetween, on which shaft a tension pulley 35 is mounted so as to be freely rotatable thereon.

Said guide pulley guard 20 may preferably be formed with an extension 36 which extends toward the bicycle rear end, supporting at its free end a stopper pin 37 so that it can prevent the tension link 30 from swinging excessively in the clockwise direction Q.

In operation, the axis ($X_1$) of the guide pulley supporting shaft 24 can be moved about the axis ($X_2$) of the shaft 21 on a circular arc with radius ($r_1$) defined by the distance between the axes ($X_1$) ($X_2$), normally being urged in the clockwise direction P by means the coil spring 23. On the other hand, the axis ($X_3$) of the tension pulley supporting shaft 34 can be moved about said axis ($X_1$) on a circular arc with radius ($r_2$) defined by the distance between the axes ($X_1$) ($X_3$), normally being urged in the clockwise direction Q by means of the spring 32.

The value of the resilient force ($F_p$) in the direction P as well as the value of the resilient force ($F_q$) in the direction Q are obtained in accordance with the spring constant ($C_p$) of the spring 23, and the spring constant ($C_q$) of the spring 32, and are variable in accordance with the turning angles of the guard portion 20b and the tension link 30, respectively. In addition, the value of chain tension ($F_t$) is also variable when the speed change lever position is varied. Thus, the three factors ($F_p$) ($F_q$) ($F_t$) must be properly balanced under influences on one another.

In the case where the spring constant ($C_p$) is predetermined so as to be relatively greater than the spring constant ($C_q$), the axis ($X_1$) becomes relatively more difficult to move about the axis ($X_2$), while the axis ($X_3$) becomes relatively easier to move about the axis ($X_2$). Thus, the derailleur 10 can develop functional characteristics similar to the conventional pendulum type or the balance type.

In contrast thereto, if the spring constant ($C_q$) is relatively greater than the spring constant ($C_p$), the axis ($X_1$) becomes relatively easier to move about the axis ($X_2$), while the axis ($X_3$) becomes relatively more difficult to move about the axis ($X_1$). Therefore, the derailler 10 develops the functional characteristics similar to the conventional so-called triangular-balance type. Thus, the rear derailleur 10 of the invention makes it possible to select the most suitable spring constants ($C_p$) ($C_q$) so as to obtain the best mode of the relative relation between the forces ($F_p$) ($F_q$).

The operational manners of the rear derailleur 10 of the invention will be more clearly understood from the following description with reference to FIGS. 4 and 5.

FIG. 4 illustrates the first example of operation, wherein the full line ($L_1$) shows the driving chain switched over into engagement with the smallest sprocket wheel ($S_1$), while the two-dot chain line ($L_2$) shows the chain shifted into engagement with the largest sprocket wheel ($S_5$). In both of the stages, tension of the chain develops moment of rotation in the counterclockwise, which should be balanced with the resilient forces ($F_p$) ($F_q$). Incidentally, FIG. 4 illustrate the case where the position ($X_2$) in the stage ($L_1$) is not coincident with that in the stage ($L_2$), which is caused when a known slant-pantograph type of parallelogramic shifter is employed which permits slantwise shifting of a movable element corresponding to said element designed by reference numeral 15.

In the stage of ($L_1$), the chain is loosened to the maximum degree, decreasing the chain tension to the minimum. Consequently, the resilient force ($F_q$) develops a powerful effect on swinging the tension pulley axis ($X_3$) to the maximum degree in the direction Q, whereby the looseness in the chain can be absorbed. On the other hand, in the stage of ($L_2$), since the chain tension is increased up to the maximum degree, the counterclockwise moment of rotation by the chain tension overcomes the resilient force ($F_p$) thereby to forcibly move the guide pulley axis ($X_1$) counterclockwise so as to assume a relatively lower position as illustrated.

As would be easily comprehensible from the foregoing description, according to the rear derailleur 10 of the invention, it is possible to move the guide pulley axis ($X_1$) to a position relatively lower than it was as well as to keep the distance between the respective sprocket wheel and the guide pulley constant at every stage of speed changes, which is the advantageous feature that was peculiar to the conventional triangular balance type of rear derailleurs.

Further, according to the rear derailleur 10 of the present invention, it is possible to predetermine a relatively large distance D between the axes ($X_1$) ($X_3$), since the tension pulley axis ($X_3$) is arranged so as to move about the guide pulley axis ($X_1$), thereby to permit a relatively large derailleur capacity (ability for absorbing looseness of the driving chain). In addition, it is possible to effect the absorbing of the looseness in the chain quickly and correctly, since the resilient force ($F_q$) can be utilized in order that the derailleur 10 can sensitively follow the variable degree of looseness in the chain. Thus, the derailleur 10 of the invention provides the substantially same advantageous features with those of the conventional pendulum type derailleurs.

FIG. 5 illustrates such a specific example for demonstrating wide applicability of the invention, wherein the derailleur of the invention is applied to two kinds of multi-stage freewheel assemblies A, B, of different dimensions, that is, the one A that includes a smallest sprocket wheel ($S_1$) and the largest sprocket wheel ($S_m$), and the other B that includes the smallest sprocket wheel ($S_1$) (common) and the largest sprocket wheel ($S_n$). In other words, FIG. 5 is an overlapped illustration of the two kinds of freewheel assemblies A, B for the purpose of clarity in comparison with each other, in which the full line ($L_3$) indicates the driving chain in engagement with the largest sprocket wheel ($S_m$) of the freewheel assembly A, while two-dot chain line ($L_4$)

denotes the chain in engagement with the largest sprocket wheel ($S_n$) of the other freewheel assembly B.

Supposing that such a derailleur of which spring constants ($C_p$) and ($C_q$) have been predetermined so as to meet the various factors peculiar to the smaller freewheel assembly B is applied to the larger freewheel assembly A, the looseness of the chain tension is, as a matter of course, reduced. Accordingly, in order to balance with this chain tension, the axis ($X_1$) is moved counterclockwise about the axis ($X_2$) to increase the force ($F_p$). Consequently, the axis ($X_3$) is also moved counterclockwise about the axis ($X_1$) in order to restore the balance with the force ($F_p$). As a result, the axis ($X_1$) is lowered by such a distance as corresponding to the difference between the radius of the sprocket wheel ($S_m$) and that of the sprocket wheel ($S_n$), thereby the distance between the guide pulley 29 and the sprocket wheel ($S_m$) is maintained properly, while the tension pulley axis ($X_3$) is moved counterclockwise under influence of the increasing chain tension. Thus, the rear derailleur facilitates a smooth shifting of the driving chain. The same effect can be obtained in the case contrary where the derailleur is applied from the larger freewheel assembly A to the smaller freewheel assembly B, permitting a wide applicability of the present application.

The present invention being thus described, it will be obvious that same may be varied in may ways. Such variations are not to be regarded as a departure from the spirit and scope of the present invention, and all such modifications as would be obvious to one skilled in the art are intended to be included within the scope of the following claims.

I claim:

1. A bicycle rear derailleur comprising:
    a guide pulley guard pivotally mounted on a first shaft which is support by a movable element of a shifter means connected to a mounting bracket fixedly secured to a bicycle rear wheel hub spindle;
    a coil spring surrounding said first shaft so as to urge said guide pulley guard in one direction about said first shaft;
    a second shaft supported by said guide pulley guard and spaced apart from said first shaft;
    an inner pulley rotatably mounted on said second shaft;
    a guide pulley rotatably mounted on said inner pulley;
    a flat spiral spring operatively interposed between said inner pulley and said second shaft;
    one end of said flat spiral spring being fixedly connected to said second shaft and another end of said flat sprial being engaged with said inner pulley;
    a tension link mounted at its upper end to said second shaft and rigidly connected to said inner pulley, so that the tension link together with said inner pulley are urged by said flat spiral spring so as to move in one direction about said second shaft;
    said tension link being provided at its lower end with a tension pulley guard;
    a third shaft supported by said tension pulley guard; and
    a tension pulley rotatably mounted on said third shaft.

2. The derailleur, as set forth in claim 1, wherein said shifter means is in the form of a deformable parallelogramic shifter.

3. The derailleur, as set forth in claim 1, wherein said guide pulley guard includes an upper arcuate portion and a lower straight portion which is inclined with its upper end directed toward a bicycle rear end.

4. The derailleur, as set forth in claim 1, wherein said second shaft is disposed at a first horizontal level above a second horizontal level where said first shaft is located.

5. The derailleur, as set forth in claim 1, wherein said guide pulley guard is formed with an extension to which a stopper pin is mounted so as to prevent said tension link from being swung excesively.

* * * * *